(12) United States Patent
Mashino et al.

(10) Patent No.: US 11,197,305 B2
(45) Date of Patent: Dec. 7, 2021

(54) WIRELESS BASE STATION AND SCHEDULING METHOD

(71) Applicant: NTT DOCOMO, INC., Tokyo (JP)

(72) Inventors: Jun Mashino, Tokyo (JP); Tatsuki Okuyama, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 9 days.

(21) Appl. No.: 16/489,573

(22) PCT Filed: Feb. 5, 2018

(86) PCT No.: PCT/JP2018/003829
§ 371 (c)(1),
(2) Date: Aug. 28, 2019

(87) PCT Pub. No.: WO2018/159226
PCT Pub. Date: Sep. 7, 2018

(65) Prior Publication Data
US 2019/0394787 A1 Dec. 26, 2019

(30) Foreign Application Priority Data

Mar. 3, 2017 (JP) .............................. JP2017-040197

(51) Int. Cl.
*H04W 72/12* (2009.01)
*H04B 7/0452* (2017.01)
(Continued)

(52) U.S. Cl.
CPC ........ *H04W 72/121* (2013.01); *H04B 7/0452* (2013.01); *H04W 16/28* (2013.01);
(Continued)

(58) Field of Classification Search
CPC .............. H04W 72/121; H04W 16/28; H04W 72/0446; H04W 72/1215; H04W 24/10;
(Continued)

(56) References Cited

U.S. PATENT DOCUMENTS

| 2010/0067471 A1* | 3/2010 | Matzuzawa ......... H04W 72/085 370/329 |
| 2014/0241192 A1* | 8/2014 | Kim ..................... H04B 7/0417 370/252 |

(Continued)

FOREIGN PATENT DOCUMENTS

| JP | 2012023785 A | 2/2012 |
| JP | 2015501611 A | 1/2015 |

OTHER PUBLICATIONS

3GPP TSG RAN WG1 Meeting #88; R1-1703402 ; Source: CMCC; Title: Discussion and evaluation on spatial-based and panel-based MU-MIMO transmission; Athens, Greece Feb. 13-17, 2017. (Year: 2017).*

(Continued)

*Primary Examiner* — Hassan A Phillips
*Assistant Examiner* — Mohammed S Chowdhury
(74) *Attorney, Agent, or Firm* — Osha Bergman Watanabe & Burton LLP

(57) ABSTRACT

A radio base station includes: an obtaining section that obtains a first communication quality of each of first communication terminals and obtains a second communication quality of each of second communication terminals having a lower communication speed than the first communication (Continued)

terminals; and a scheduler that schedules the first communication terminals based on the first communication qualities and schedules the second communication terminals based on the second communication qualities, and when the scheduler schedules the first communication terminals and the second communication terminals, the scheduler subjects the first communication terminals to space-division multiplexing and subjects the second communication terminals to frequency-division multiplexing or time-division multiplexing.

4 Claims, 8 Drawing Sheets

(51) Int. Cl.
*H04W 16/28* (2009.01)
*H04W 72/04* (2009.01)
*H04W 24/10* (2009.01)
(52) U.S. Cl.
CPC ... *H04W 72/0446* (2013.01); *H04W 72/1215* (2013.01); *H04W 24/10* (2013.01)
(58) Field of Classification Search
CPC ........... H04W 72/0453; H04W 72/046; H04W 72/1231; H04W 4/08; H04B 7/0452
See application file for complete search history.

(56) References Cited

U.S. PATENT DOCUMENTS

| | | | |
|---|---|---|---|
| 2014/0286291 A1* | 9/2014 | Einhaus | H04B 7/024 370/329 |
| 2015/0146687 A1 | 5/2015 | Kim et al. | |
| 2017/0099125 A1* | 4/2017 | Bengtsson | H04L 1/1671 |
| 2017/0117948 A1* | 4/2017 | Takano | H04B 7/10 |
| 2017/0155441 A1* | 6/2017 | Lee | H04B 7/0842 |
| 2017/0257155 A1* | 9/2017 | Liang | H04L 25/0202 |
| 2017/0353947 A1* | 12/2017 | Ang | H04L 5/0048 |
| 2019/0165983 A1* | 5/2019 | Nakayama | H04W 56/001 |

OTHER PUBLICATIONS

3GPP TSG RAN WG1 Meeting #87;R1-1612479; Source: Samsung; Title: DMRS-based spatial multiplexing for UL NR MIMO Reno, USA Nov. 14-18, 2016. (Year: 2016).*
International Search Report issued in PCT/JP2018/003829 dated Apr. 10, 2018 (5 pages).
Written Opinion of the International Searching Authority issued in PCT/JP2018/003829 dated Apr. 10, 2018 (3 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
Notice of Reasons for Refusal issued in corresponding Japanese Application No. 2017-040197 dated May 11, 2021 (8 pages).

* cited by examiner

WIRELESS BASE STATION AND SCHEDULING METHOD

TECHNICAL FIELD

The present invention relates to a radio base station and a scheduling method.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE have also been studied for achieving a broader bandwidth and a higher speed based on 4G (4th generation mobile communication system) such as LTE, and are called, e.g., 5G (5th generation mobile communication system).

5G is expected to achieve a 10 Gbps-level user throughput, which is much higher than those of conventional mobile communication systems, by means of development of broadband frequency resources based on use of high frequency bands as well as beam forming and spatial multiplexing based on the Massive MIMO (multiple-input and multiple-output) technique utilizing super multi-element antennae.

It is contemplated that as communication tools or information terminals, smartphones will continue to become more popular and become one of main streams of communication terminals accommodated in 5G. Therefore, it is contemplated that 5G will demand achievement of higher-speed communications.

As mentioned above, while 5G provides enhancement in maximum user throughput, in the 5G era, proliferation of communications with no human intervention, represented by IoT (Internet of things), is expected as well. There are a wide variety of requirements for communications with no human intervention ranging from low-frequency, very low-speed communication of several Kbytes once a month for sensor concentration to real-time low speed communication for continuous uploading of image data of around several Mbps to several tens of Mbps from a monitoring camera.

In view of, e.g., terminal costs, communication terminals with no human intervention do not necessarily need to be accommodated in 5G, but, from the perspective of deterrence of shortage of radio resources in conventional mobile communication systems, for example, low-speed communication terminals requiring a transmission speed of around a user throughput that is equivalent to that of LTE (several Mbps to ten Mbps) are worthy to be accommodated in a same 5G system as general user terminals that perform 10 Gbps-level communications. In other words, it is important to perform scheduling in such a manner that radio resources are efficiently assigned to high-speed communication terminals and low-speed communication terminals.

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

However, currently, no scheduling method for efficiently assigning radio resources to a plurality of communication terminals whose required transmission speeds have a difference of, for example, around 1000 times in a radio communication system utilizing Massive MIMO has been proposed.

Therefore, an object of the present invention is to provide a scheduling technique that efficiently assigns radio resources to high-speed communication terminals and low-speed communication terminals in a radio communication system utilizing Massive MIMO.

Solution to Problem

A radio base station of the present invention includes: an obtaining section that obtains a first communication quality of each of first communication terminals and obtains a second communication quality of each of second communication terminals having a lower communication speed than the first communication terminals; and a scheduler that schedules the first communication terminals based on the first communication qualities and schedules the second communication terminals based on the second communication qualities, in which, when the scheduler schedules the first communication terminals and the second communication terminals, the scheduler subjects the first communication terminals to space-division multiplexing and subjects the second communication terminals to frequency-division multiplexing or time-division multiplexing.

Advantageous Effects of Invention

The present invention enables efficient assignment of radio resources in a radio communication system including high-speed communication terminals and low-speed communication terminals.

DESCRIPTION OF EMBODIMENTS

Hereinafter, embodiments of the present invention will be described in detail with reference to the accompanying drawings.

Embodiment 1

Figure 1:
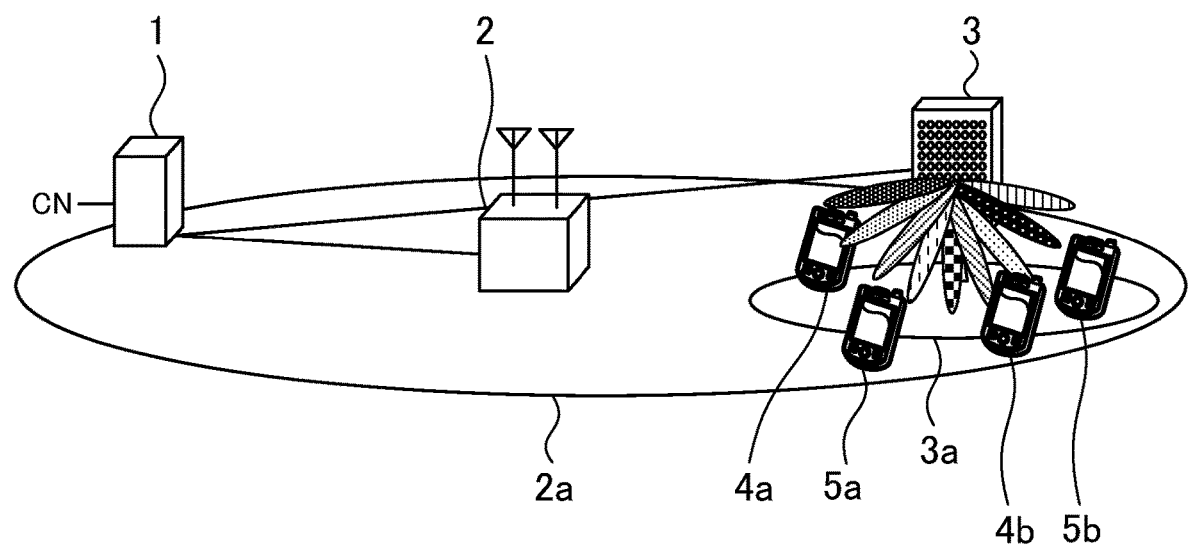
FIG. 1 is a diagram illustrating an example configuration of a radio communication system to which a radio base station (MMeNB) according to Embodiment 1 is applied.

FIG. 1 is a diagram illustrating an example configuration of a radio communication system to which a radio base station (MMeNB) according to Embodiment 1 is applied. As illustrated in FIG. 1, the radio communication system includes a CC (central controller) 1, MeNB (macro base station) 2, MMeNB (Massive MIMO base station) 3, high-speed communication terminals 4a, 4b and low-speed communication terminals 5a, 5b. In FIG. 1, only one MMeNB 3 is illustrated, but a plurality of MMeNBs 3 may be provided. Also, only two high-speed communication terminals 4a, 4b and only two low-speed communication terminals 5a, 5b are illustrated, respectively, but more high-speed communication terminals 4a, 4b and more low-speed communication terminals 5a, 5b may be provided.

MeNB 2 forms broad-area cell 2a. MMeNB 3 forms narrow-area cell 3a that is smaller than cell 2a. For a next-generation radio communication system (for example, 5G), it is contemplated that a heterogeneous network in which a plurality of narrow-area cells 3a are formed in broad-area cell 2a may be employed.

MMeNB 3 is, for example, a radio base station including super multi, for example, hundreds of, element antennae. MMeNB 3 performs radio communication with high-speed communication terminals 4a, 4b on a downlink and/or an uplink, by means of space-division multiplexing. Likewise, MMeNB 3 also performs radio communication with low-speed communication terminals 5a, 5b by means of frequency-division multiplexing or time-division multiplexing.

Where high-speed communication terminals 4a, 4b and low-speed communication terminals 5a, 5b are located in cell 3a formed by MMeNB 3, high-speed communication terminals 4a, 4b and low-speed communication terminals 5a, 5b can perform radio communication with both MeNB 2 and MMeNB 3. Consequently, for high-speed communication terminals 4a, 4b and low-speed communication terminals 5a, 5b, for example, c-planes (control planes) are supported by MeNB 2. Also, for high-speed communication terminals 4a, 4b and low-speed communication terminals 5a, 5b, for example, u-planes (user planes) are supported by MMeNB 3.

In the radio communication system illustrated in FIG. 1, cell 2a that provides a c-plane and cell 3a that provides a u-plane may be operated using different frequency bands. For example, it is possible that cell 2a that provides a c-plane is operated using a low frequency band (for example, a 800 MHz band or a 2 GHz band) and cell 3a that provides a u-plane is operated using a high frequency band (for example, a frequency band of 3 GHz or higher).

MeNB 2 and MMeNB 3 are connected to CC 1. CC 1 is connected to a core network (CN). CC 1 is, for example, an access gateway apparatus, an RNC (radio network controller) or an MME (mobility management entity). MeNB 2 may have a part or all of functions of CC 1.

MMeNB 3 transmits DL (downlink) control signals to high-speed communication terminals 4a, 4b and low-speed communication terminals 5a, 5b using a downlink control channel or an uplink control channel.

MMeNB 3 transmits DL data signals to high-speed communication terminals 4a, 4b and low-speed communication terminals 5a, 5b using a downlink data channel.

High-speed communication terminals 4a, 4b and low-speed communication terminals 5a, 5b each transmit a UL (uplink) control signal to MMeNB 3 using the uplink control channel.

High-speed communication terminals 4a, 4b and low-speed communication terminals 5a, 5b each transmit a UL data signal to MMeNB 3 using an uplink data channel.

In 5G, it is expected to achieve a 10 Gbps-level user throughput, which is much higher than those of conventional radio communication systems, by means of beam forming and spatial multiplexing based on the Massive MIMO technique having super multi-element antennae. For example, MMeNB 3 controls an amplitude and a phase of a transmission signal using a plurality of antennae to form a transmission beam having directivity toward high-speed communication terminals 4a, 4b (BF: beam forming) and performs signal transmission, thereby achieving a 10 Gbps-level user throughput. Also, MMeNB 3, for example, forms transmission beams having different directivities toward high-speed communication terminals 4a, 4b and other communication terminals, enabling spatial multiplexing among users.

However, there is a difference of around 1000 times in dynamic range of required transmission speed between high-speed communication terminals targeted for maximum 10 Gbps-level communication and low-speed communication terminals targeted for communication of several tens of Mbps. Therefore, in order to support high-speed communication terminals and low-speed communication terminals in a single radio communication system and a single frequency band, a proper scheduling method for efficiently accommodating these communication terminals is required.

In 4G, two-dimensional, time-frequency, scheduling premised on frequency domain scheduling is adopted. Although depending on the duplex method, for example, on a downlink, a radio base station transmits a reference signal to communication terminals. Each communication terminal measures a reception quality for a frequency band of each radio resource block based on the reference signal and reports CQIs (channel quality indicators) of top K (K is a positive integer) bands of favorable quality, to the radio base station. Then, the radio base station assigns a frequency band favorable for the communication terminal based on information collected from the communication terminal.

In a 4G or earlier radio communication system using low frequencies, a plurality of reflected waves come from various angles in operation in, e.g., an urban area or indoors. Therefore, the 4G or earlier radio communication system enters a multipath-rich environment, resulting in occurrence of frequency selective fading. Therefore, as described above, a radio base station avoids use of a frequency band in which a notch has occurred, by means of frequency domain scheduling. Consequently, the 4G or earlier radio communication system can obtain a user diversity effect, enabling enhancement in frequency use efficiency.

On the other hand, in 5G, which uses a high frequency band, even in an operation in an environment that is similar to that of a conventional system, angular spreading of incoming waves is decreased by beam forming based on Massive MIMO in addition to linearity of propagation of radio waves because of the high frequency band. Thus, in 5G, it is contemplated that an effect of frequency selective fading is reduced.

The high speed of a high-speed communication terminal accommodated in 5G is premised on use of a broad band in addition to spatial multiplexing using a plurality of streams. Therefore, a 5G radio communication system can be regarded as being incompatible with a conventional frequency domain scheduler that finely divides frequencies.

On the other hand, where low-speed communication terminals accommodated in 5G use all of radio resources, in consideration of features of broadband 5G frequency resources, such use results in the relationship "required transmission speed<<transmission capacity" in which radio resources are inefficiently used. Therefore, precise radio resource control based on frequency domain or time domain scheduling is desired. However, in a 5G radio communication system, it is supposed that as the band becomes broader, for example, the number of radio resource blocks increases or the number of concurrent user connections increases. Under such circumstances, reporting CQIs of radio resource blocks of top level equality to a radio base station, for example, according to frequency domain scheduling in order to obtain a user diversity effect, is not proper from the perspective of control overhead.

Figure 4:
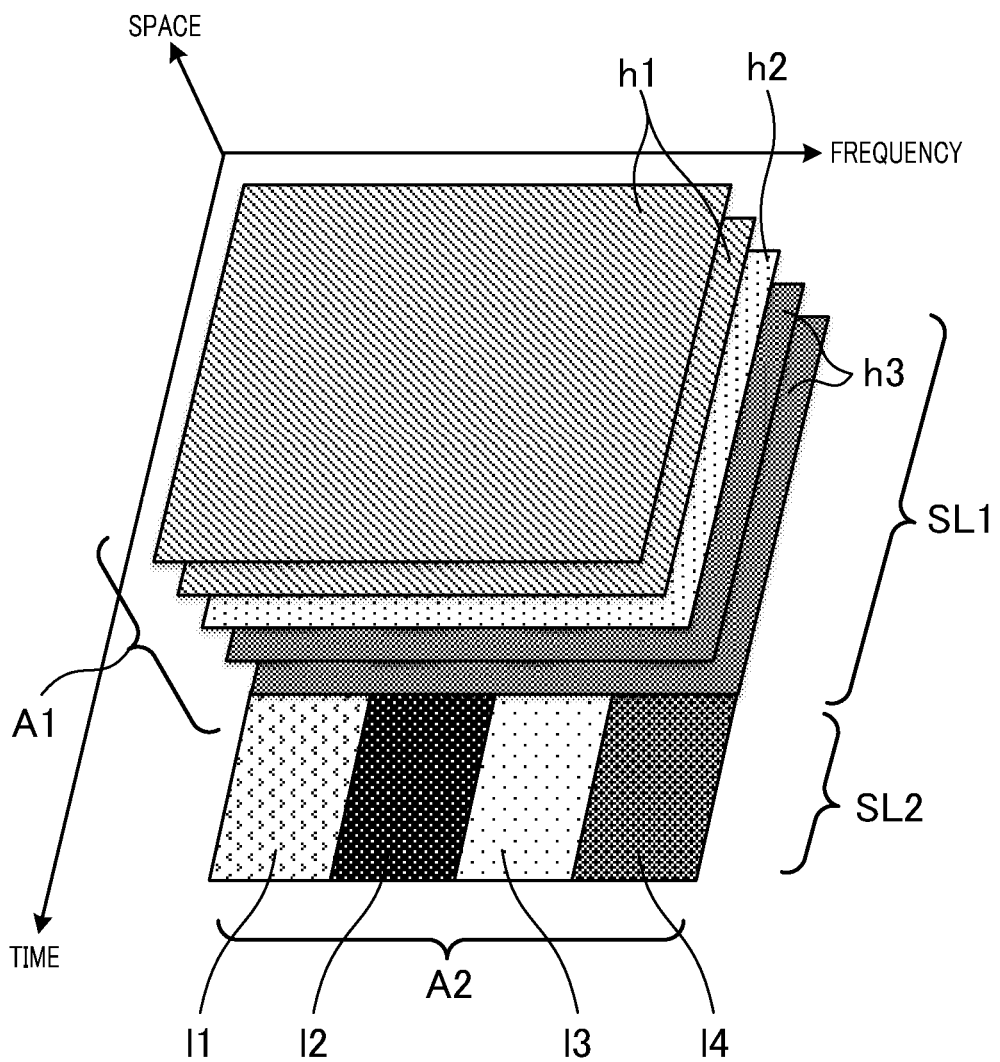
FIG. 4 is a diagram illustrating operation of a scheduler.

Therefore, when MMeNB 3 schedules the downlinks and/or the uplinks of high-speed communication terminals 4a, 4b and low-speed communication terminals 5a, 5b, MMeNB 3 subjects high-speed communication terminals 4a, 4b to space-division multiplexing and subjects low-speed communication terminals 5a, 5b, which are slower in communication speed than high-speed communication terminals 4a, 4b, to frequency-division multiplexing or time-division multiplexing (see, for example, FIG. 4. In FIG. 4, the low-speed communication terminals are subjected to frequency-division multiplexing). Consequently, even if high-speed communication terminals 4a, 4b and low-speed communication terminals 5a, 5b whose communication speeds are greatly different from each other are provided subordinate to MMeNB 3 (within cell 3a), MMeNB 3 can perform efficient assignment of downlink and/or uplink radio resources.

Figure 2:
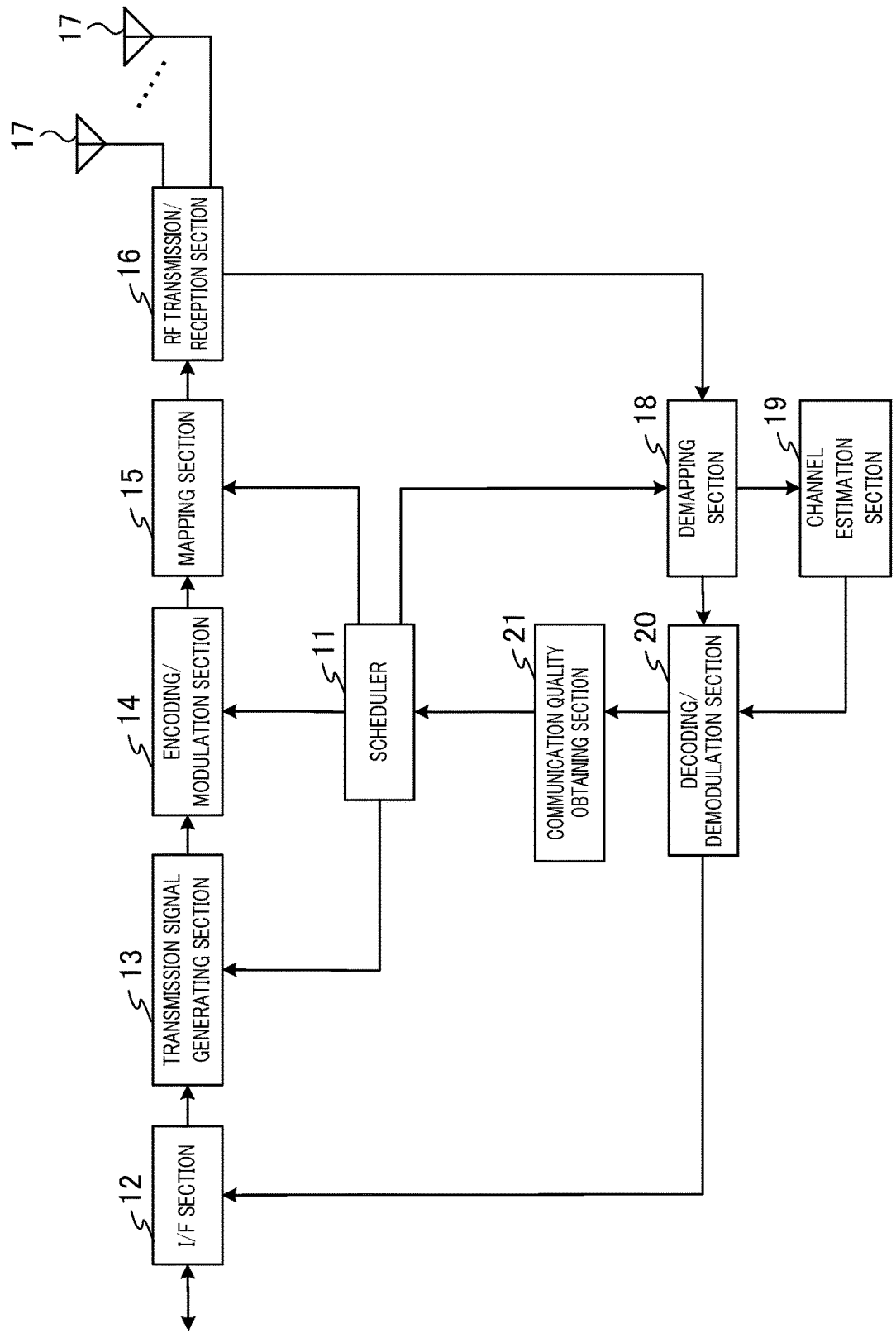
FIG. 2 is a diagram illustrating an example block configuration of the MMeNB.

FIG. 2 is a diagram illustrating an example block configuration of MMeNB 3. As illustrated in FIG. 2, MMeNB 3 includes scheduler 11, I/F section 12, transmission signal generating section 13, encoding/modulation section 14, mapping section 15, RF (radio frequency) transmission/reception section 16, antennae 17, demapping section 18, channel estimation section 19, decoding/demodulation section 20 and communication quality obtaining section 21. In the below, where there is no need to distinguish high-speed communication terminals 4a, 4b and low-speed communication terminals 5a, 5b from each other, high-speed communication terminals 4a, 4b and low-speed communication terminals 5a, 5b may simply be referred to as communication terminals.

Scheduler 11 schedules DL signals based on qualities of communication between MMeNB 3 and the communication terminals, the qualities being output from communication quality obtaining section 21. Each DL signal includes a DL data signal and a DL control signal, which have been mentioned above.

Scheduler 11 schedules UL signals based on qualities of communication between MMeNB 3 and the communication terminals, the qualities being output from communication quality obtaining section 21. Each UL signal includes a UL data signal and a UL control signal, which have been mentioned above.

Scheduler 11 determines, e.g., an MCS (modulation and coding scheme) for DL data signals and UL data signals based on the qualities of communication between MMeNB 3 and the communication terminals, which are output from communication quality obtaining section 21. Here, the present invention is not limited to the case where MMeNB 3 sets the MCS, and a communication terminal may set the MCS. Where a communication terminal sets the MCS, MMeNB 3 may receive the MCS information from the communication terminal (not illustrated).

I/F section 12 performs communication with CC 1, which is a higher-level apparatus. I/F section 12 performs, for example, processing for layers that are higher than the physical layer or the MAC layer. I/F section 12 receives, for example, data to be transmitted to communication terminals, from CC 1. Also, I/F section 12 transmits data received from communication terminals, to CC 1.

The transmission signal generating section 13 generates DL signals each including a DL data signal and a DL control signal. The DL data signal included in each DL signal includes, for example, user data received by I/F section 12. Also, the DL control signals included in each DL signal includes scheduling information generated by scheduler 11, the information including radio resource assignment information for the DL data signal and radio resource assignment information for a UL data signal. The DL control signal included in each DL signal includes downlink control information (DCI) including the MCS information generated by scheduler 11.

Encoding/modulation section 14 performs encoding processing and modulation processing on the DL signals output from the transmission signal generating section 13, based on the MCS information generated by scheduler 11.

Mapping section 15 maps the DL signals output from encoding/modulation section 14 on predetermined radio resources (DL resources) based on the scheduling information generated by scheduler 11. If mapping section 15 subjects the DL signals to space-division multiplexing based on the scheduling information generated by scheduler 11, mapping section 15 performs both or either of precoding processing and BF processing on the DL signals. Also, if mapping section 15 subjects the DL signals to frequency-division multiplexing, mapping section 15 performs OFDM (orthogonal frequency-division multiplexing) processing on the DL signals based on the scheduling information generated by scheduler 11.

RF transmission/reception section 16 performs transmission processing, such as up-conversion and amplification, on the DL signals output from mapping section 15 and transmits the resulting DL signals to the communication terminals from the plurality of antennae 17. Also, RF transmission/reception section 16 performs reception processing, such as amplification and down-conversion, on UL signals transmitted by the communication terminals and received by the plurality of antennae 17.

The demapping section 18 separates (demaps) UL data signals and UL control signals from the communication terminals, from the UL signals output from RF transmission/reception section 16, based on the scheduling information generated by scheduler 11 (UL radio resource assignment information).

Channel estimation section 19 estimates a UL channel condition, based on a reference signal included in each UL control signal demapped by the demapping section 18.

Decoding/demodulation section 20 demodulates and decodes the UL control signals and the UL data signals demapped by the demapping section 18, based on the channel condition estimated by channel estimation section 19. The UL data signals demodulated and decoded by decoding/demodulation section 20 are, for example, transmitted to CC 1 via I/F section 12.

Communication quality obtaining section 21 obtains DL communication qualities of communication between MMeNB 3 and the respective communication terminals, from the UL control signals demodulated and decoded by decoding/demodulation section 20.

Figure 3:
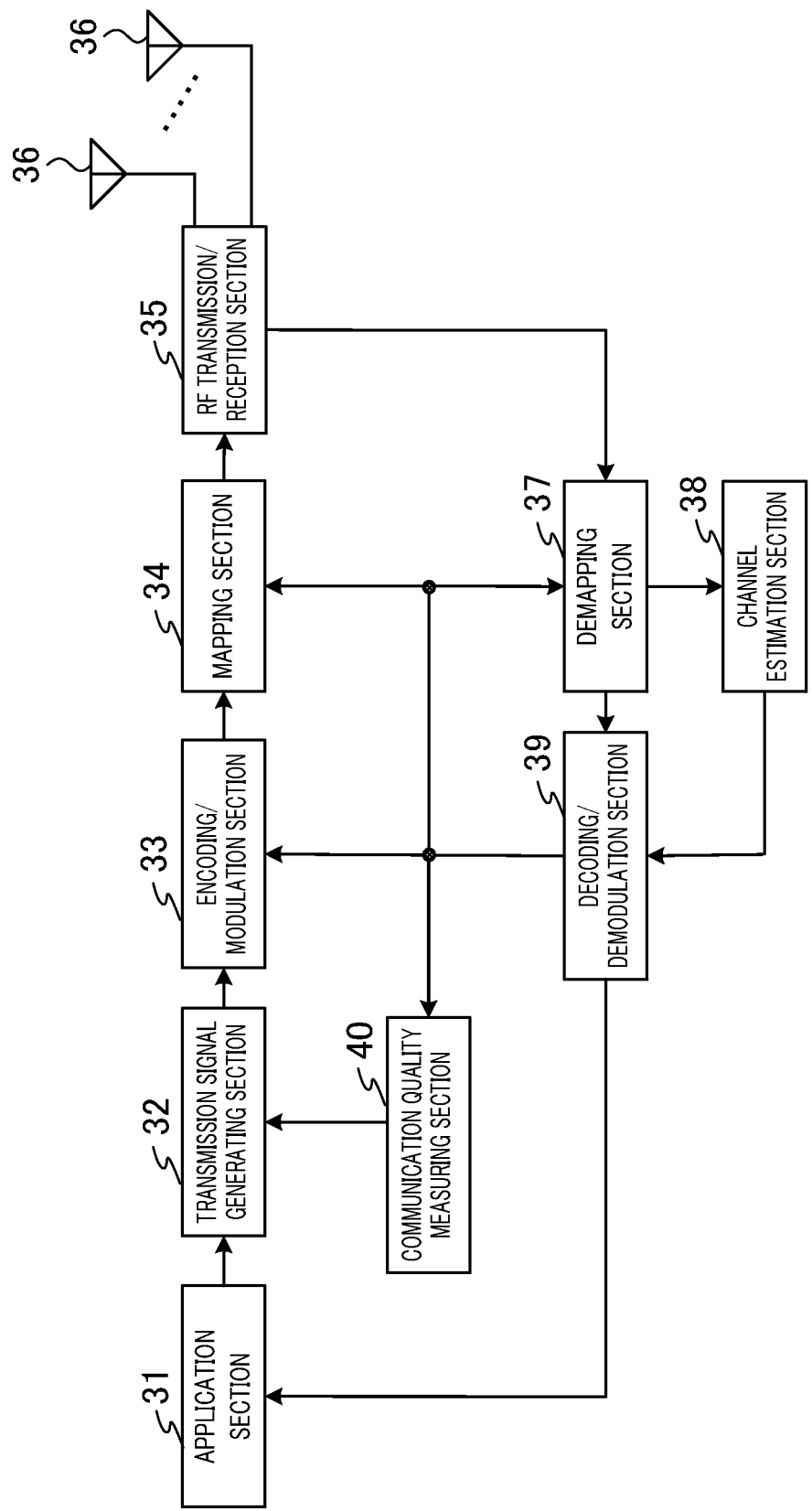
FIG. 3 is a diagram illustrating an example block configuration of a communication terminal.

FIG. 3 is a diagram illustrating an example block configuration of a communication terminal. As illustrated in FIG. 3, a communication terminal includes application section 31, transmission signal generating section 32, encoding/modulation section 33, mapping section 34, RF transmission/reception section 35, antennae 36, demapping section 37, channel estimation section 38, decoding/demodulation section 39 and communication quality measuring section 40.

RF transmission/reception section 35 performs reception processing, such as amplification and down-conversion, on a DL signal transmitted by MMeNB 3 and received via the plurality of antennae 36.

Demapping section 37 separates (demaps) a DL control signal from the DL signal output from RF transmission/reception section 35. Also, demapping section 37 separates (demaps) a DL data signal for the relevant communication terminal from the DL signal output from RF transmission/reception section 35, based on scheduling information (DL radio resource assignment information) output from decoding/demodulation section 39. If the communication terminal illustrated in FIG. 3 is high-speed communication terminal 4a or 4b, demapping section 37 separates the DL signal subjected to space-division multiplexing. Also, if the communication terminal illustrated in FIG. 3 is low-speed communication terminal 5a or 5b, demapping section 37 separates the DL signal subjected to frequency-division multiplexing or time-division multiplexing.

The channel estimation section 38 estimates a DL channel condition based on a reference signal included in the DL control signal demapped by demapping section 37.

Decoding/demodulation section 39 demodulates and decodes the DL control signal and the DL data signal demapped by demapping section 37, based on the channel condition estimated by the channel estimation section 38.

Decoding/demodulation section 39 outputs DL schedule information included in the demodulated and decoded DL control signal, to demapping section 37. Decoding/demodulation section 39 also outputs UL schedule information (UL radio resource assignment information) and MCS information included in the demodulated and decoded DL control signal, to encoding/modulation section 33 and mapping section 34. Decoding/demodulation section 39 also outputs the reference signal included in the DL control signal to communication quality measuring section 40. Decoding/demodulation section 39 also outputs the demodulated and decoded DL data signal to application section 31.

Communication quality measuring section 40 measures a DL communication quality based on the reference signal demodulated and decoded by decoding section/demodulation section 39.

Application section 31 performs, e.g., processing for, for example, layers that are higher than the physical layer or the MAC layer.

Transmission signal generating section 32 generates a UL signal including a UL data signal and a UL control signal. The UL data signal included in the UL signal includes, for example, user data output from application section 31. The UL control signal included in the UL signal includes the DL communication quality measured by communication quality measuring section 40.

Encoding/modulation section 33 performs encoding processing and modulation processing on the UL signal output from transmission signal generating section 32, based on the UL MCS information demodulated and decoded by decoding/demodulation section 39.

Mapping section 34 maps the UL signal output from encoding/modulation section 33 on a predetermined radio resource (UL resource), based on the UL scheduling information demodulated and decoded by decoding/demodulation section 39.

RF transmission/reception section 35 performs transmission processing, such as up-conversion and amplification, on the UL signal output from mapping section 34 and transmits the resulting UL signal to a communication terminal from the plurality of antennae 36.

Operation of scheduler 11 in MMeNB 3 illustrated in FIG. 2 will be described. In the below, it is assumed that high-speed communication terminals H1 to H3 and low-speed communication terminals L1 to L4 are provided subordinate to MMeNB 3.

FIG. 4 is a diagram illustrating operation of scheduler 11. In FIG. 4, example radio resources assigned to high-speed communication terminals H1 to H3 and low-speed communication terminals L1 to L4 are illustrated. In the below, for simplicity of description, downlink scheduling will be described.

When scheduler 11 schedules downlinks of high-speed communication terminals H1 to H3 and low-speed communication terminals L1 to L4, scheduler 11 subjects high-speed communication terminals H1 to H3 to space-division multiplexing and subjects low-speed communication terminals L1 to L4 to frequency-division multiplexing.

For example, as indicated in radio resource A1 illustrated in FIG. 4, scheduler 11 does not multiplex high-speed communication terminals H1 to H3 in a frequency direction but multiplexes high-speed communication terminals H1 to H3 in a space direction. Also, as indicated in radio resource A2, scheduler 11 does not multiplex low-speed communication terminals L1 to L4 in the space direction but multiplex low-speed communication terminals L1 to L4 in the frequency direction or a time direction (FIG. 4 indicates an example of frequency-division multiplexing).

As indicated in radio resource A1, scheduler 11 assigns an entire allocable frequency domain to high-speed communication terminals H1 to H3. Consequently, high-speed transmission using a broad band is achieved for high-speed communication terminals H1 to H3. As a matter of course, scheduler 11 may divide a frequency domain or a time domain to assign radio resources to high-speed communication terminals H1 to H3 (space-division multiplexing, frequency-division multiplexing and time-division multiplexing may be combined).

Scheduling for high-speed communication terminals H1 to H3 will be described in detail. Scheduler 11 schedules space-division multiplexing of high-speed communication terminals H1 to H3 based on downlink communication qualities. For example, scheduler 11 increases counts of layers assigned to high-speed communication terminals H1 to H3 as downlink SNRs (signal-to-noise ratios) between MMeNB 3 and high-speed communication terminals H1 to H3 are larger.

Figures 5, 6:
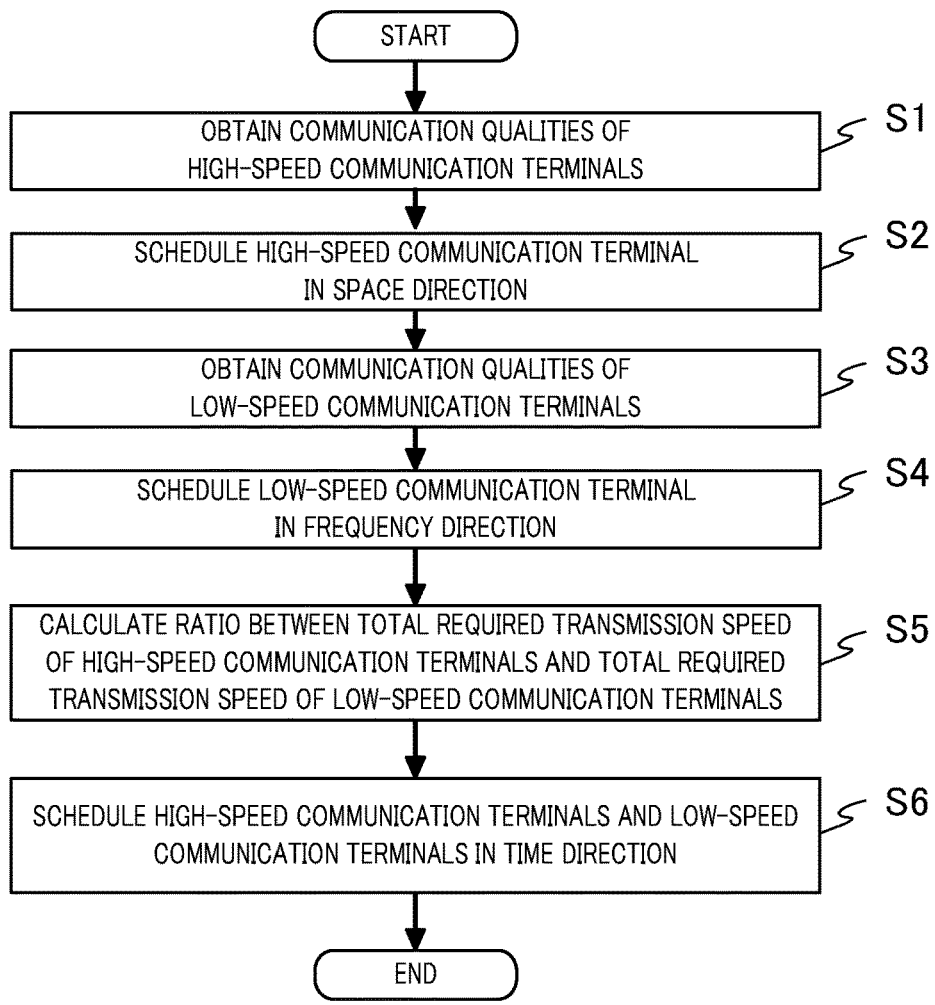
FIG. 5 is a diagram illustrating an example table for subjecting high-speed communication terminals to space-division multiplexing.
FIG. 6 is a diagram illustrating an example downlink scheduling operation of the MMeNB.

FIG. 5 is an example table for space-division multiplexing of high-speed communication terminals H1 to H3. In FIG. 5, table 51 stored in a storage section (not illustrated in FIG. 2) of MMeNB 3 is illustrated. Table 51 includes a "SNR" column and a "layer count" column.

The "SNR" column in table 51 indicates downlink SNRs between MMeNB 3 and high-speed communication terminals H1 to H3. The "layer count" column indicates the counts of MIMO layers assigned to high-speed communication terminals H1 to H3.

Scheduler 11 schedules space-division multiplexing of high-speed communication terminals H1 to H3 with reference to table 51. For example, if the SNR of high-speed communication terminal H1 is "15 dB", scheduler 11 assigns "2" MIMO layers to high-speed communication terminal H1. In other words, scheduler 11 performs scheduling so that a larger number of MIMO layers are assigned to high-speed communication terminals H1 to H3 having a higher SNR. However, if there is an upper limit of the counts of layers supported by each communication terminal, such upper limit is taken into consideration as a constraint.

Radio resources h1 illustrated in FIG. 4 indicate example radio resources assigned to high-speed communication terminal H1. Radio resource h2 indicates an example radio resource assigned to high-speed communication terminal H2. Radio resources h3 indicate example radio resources assigned to high-speed communication terminal H3.

In other words, in FIG. 4, an example of scheduling in which two layers are assigned to high-speed communication terminal H1, one layer is assigned to high-speed communication terminal H2 and two layers are assigned to high-speed communication terminal H3 is indicated.

Scheduling of low-speed communication terminals L1 to L4 will be described in detail. Scheduler 11 schedules frequency-division multiplexing of low-speed communication terminals L1 to L4 based on downlink communication qualities.

For example, each of low-speed communication terminals L1 to L4 generates information on a position of a radio resource block whose DL communication quality does not satisfy a predetermined condition and transmits the information to MMeNB 3. More specifically, each of low-speed communication terminals L1 to L4 transmits information on a position of a radio resource block intended to be prevented from being assigned because of poor downlink reception quality, to MMeNB 3. Based on the communication qualities received from low-speed communication terminals L1 to L4 (information on positions of radio resource blocks intended to be prevented from being assigned), scheduler 11 selects a radio resource block for each of low-speed communication terminals L1 to L4 from among radio resource blocks of frequencies for which assignment of a radio resource block is not prevented, and assigns the radio resource block to the low-speed communication terminal.

In conventional frequency scheduling, information on CQIs of top K radio resource blocks having good reception quality is fed back to a radio base station. However, in 5G, frequency selective fading is alleviated, and thus, low-speed communication terminals L1 to L4 may notify MMeNB 3 of, for example, respective positions of radio resource blocks having poor reception quality in which, e.g., a notch has occurred. Consequently, scheduler 11 can reduce control overhead such as CQI information compared to conventional frequency scheduling. Also, even with the method in which information on positions of radio resource blocks having poor reception quality is provided to MMeNB 3, a sufficient user diversity effect can be obtained.

Radio resources l1 to l4 illustrated in FIG. 4 indicate radio resources assigned to low-speed communication terminals L1 to L4. For example, radio resource l1 indicates a radio resource assigned to low-speed communication terminal L1. Radio resource l2 indicates a radio resource assigned to low-speed communication terminal L2. Radio resource l3 indicates a radio resource assigned to low-speed communication terminal L3. Radio resource l4 indicates a radio resource assigned to low-speed communication terminal L4.

Scheduling in the time direction of high-speed communication terminals H1 to H3 and low-speed communication terminals L1 to L4 will be described in detail. Scheduler 11 assigns downlinks of high-speed communication terminal H1 to H3 and downlinks of low-speed communication terminal L1 to L4 to different time slots.

For example, scheduler 11 assigns high-speed communication terminals H1 to H3 to time slot SL1 illustrated in FIG. 4 and assigns low-speed communication terminals L1 to L4 to time slot SL2 that is different from time slot SL1.

The number of time slots assigned to high-speed communication terminals H1 to H3 and the number of time slots assigned to low-speed communication terminals L1 to L4 are determined according to, for example, a ratio between a total required transmission speed of high-speed communication terminals H1 to H3 and a total required transmission speed of low-speed communication terminals L1 to L4. For example, if the ratio between the total required transmission speed of high-speed communication terminals H1 to H3 and the total required transmission speed of low-speed communication terminals L1 to L4 is "3:1", the scheduler assigns three time slots to high-speed communication terminals H1 to H3 and assigns one time slot to low-speed communication terminals L1 to L4.

FIG. 6 is a diagram illustrating an example downlink scheduling operation of MMeNB 3. MMeNB 3 performs the processing in the flowchart illustrated in FIG. 6 on a predetermined cycle.

First, communication quality obtaining section 21 obtains a communication quality of each of high-speed communication terminals H1 to H3 (step S1). For example, communication quality obtaining section 21 obtains a DL SNR for each of high-speed communication terminals H1 to H3.

Next, scheduler 11 schedules high-speed communication terminals H1 to H3 in the space direction based on the communication qualities of high-speed communication terminals H1 to H3 obtained in step S1 (step S2). For example, based on the SNRs obtained in step S1, scheduler 11 determines a combination of layer counts of high-speed communication terminals H1 to H3 within the number of transmission antennae with reference to table 51 illustrated in FIG. 5 and assigns the respective layers to high-speed communication terminals H1 to H3.

Next, communication quality obtaining section 21 obtains a communication quality of each of low-speed communication terminals L1 to L4 (step S3). For example, communication quality obtaining section 21 obtains information on a position of a radio resource block, assignment of which is prevented, for each of low-speed communication terminals L1 to L4.

Next, scheduler 11 schedules low-speed communication terminals L1 to L4 in the frequency direction based on the communication qualities of low-speed communication terminals L1 to L4 obtained in step S3 (step S4). For example, scheduler 11 assigns respective radio resource blocks, assignment of which are not prevented, for low-speed communication terminals L1 to L4, to low-speed communication terminals L1 to L4.

Next, scheduler 11 calculates a ratio between a total required transmission speed of high-speed communication terminals H1 to H3 and a total required transmission speed of low-speed communication terminals L1 to L4 (step S5).

Next, scheduler 11 schedules high-speed communication terminals H1 to H3 and low-speed communication terminals L1 to L4 in the time direction based on the total required transmission speed ratio calculated in step S5 (step S6). Then, scheduler 11 terminates the processing in the flowchart.

The processing sequence in MMeNB 3 is not limited to the example in FIG. 6. For example, communication quality obtaining section 21 obtains the communication qualities of low-speed communication terminals L1 to L4 in step S3, but may obtain the communication qualities in step S1.

Although downlink scheduling has been described in FIG. 4 onwards, uplink scheduling can be performed in a manner that is similar to the above. In other words, scheduler 11 performs scheduling so that high-speed communication terminals H1 to H3 are subjected to space-division multiplexing and low-speed communication terminals L1 to L4 are subjected to frequency-division multiplexing or time-division multiplexing based on uplink communication qualities.

As described above, communication quality obtaining section 21 obtains respective downlink and/or uplink communication qualities of high-speed communication terminals H1 to H3. Also, communication quality obtaining section 21 obtains respective downlink and/or uplink communication qualities of low-speed communication terminals L1 to L4. Scheduler 11 schedules the downlinks and/or the uplinks of high-speed communication terminals H1 to H3 and low-speed communication terminals L1 to L4 based on the obtained communication qualities. When scheduler 11 schedules the downlinks and/or the uplinks of high-speed communication terminals H1 to H3 and the downlinks and/or the uplinks of low-speed communication terminals L1 to L4, scheduler 11 subjects high-speed communication terminals H1 to H3 to space-division multiplexing and subjects low-speed communication terminals L1 to L4 to frequency-division multiplexing or time-division multiplexing. Consequently, scheduler 11 can efficiently assign downlink and/or uplink radio resources.

Also, the communication qualities of low-speed communication terminal L1 to L4 include information on frequencies for which assignment of radio resource blocks in the frequency direction is prevented, and scheduler 11 selects respective radio resource blocks from among radio resource blocks of frequencies for which assignment of a radio resource block is not prevented, and assigns the respective radio resource blocks to the downlinks of low-speed communication terminals L1 to L4. Consequently, scheduler 11 can reduce control overhead such as CQI information and achieves low delay.

Also, scheduler 11 assigns high-speed communication terminals H1 to H3 and low-speed communication terminals L1 to L4 to different time slots. Consequently, MMeNB 3 can perform radio communication with low-speed communication terminals L1 to L4 for which special separation based on beam forming cannot be expected.

Also, scheduler 11 determines the counts of time slots assigned to high-speed communication terminals H1 to H3 and low-speed communication terminals L1 to L4 according to the ratio between the total required transmission speed of high-speed communication terminals H1 to H3 and the total required transmission speed of low-speed communication terminals L1 to L4. Consequently, time resources for high-speed communication terminals H1 to H3 are reduced, but the reduction of the time resources for high-speed communication terminals H1 to H3 is limited if, for example, the relationship between "total required transmission speed of high-speed communication terminals>>total required transmission speed of low-speed communication terminals" contemplated in 5G is established.

Although in the above, scheduler 11 determines the counts of assigned layers according to the SNRs of high-speed communication terminals H1 to H3, the present invention is not limited to this example. For example, communication quality obtaining section 21 obtains a downlink or uplink channel. Scheduler 11 may calculate an eigenvalue of the channel obtained by communication quality obtaining section 21 and determine the counts of layers for high-speed communication terminals H1 to H3 according to counts of eigenvectors each having an eigenvalue of an effective magnitude (for example, an eigenvalue that is equal to or exceeds a predetermined threshold value).

Also, for example, in TDD (time division duplex) transmission, there is reciprocity between a downlink and an uplink. Therefore, although in the above, communication quality obtaining section 21 obtains the downlink communication qualities, communication quality obtaining section 21 may obtain uplink communication qualities. For example, communication quality obtaining section 21 may obtain SNRs of the high-speed communication terminals and obtain information on radio resource blocks prevented from being assigned to the low-speed communication terminals based on reference signals transmitted from the communication terminals. Then, scheduler 11 may perform scheduling based on the uplink communication qualities. More specifically, communication quality obtaining section 21 may obtain (calculate) uplink SNRs, uplink channels, and information on frequencies of radio resource blocks not to be assigned to the communication terminals, based on reference signals transmitted from the communication terminals.

Also, although MMeNB 3 performs the above-described scheduling, MeNB 2 may perform the scheduling. In this case, MeNB 2 transmits a result of the scheduling to MMeNB 3. MMeNB 3 assigns radio resources to the subordinate communication terminals based on the scheduling result transmitted from MeNB 2.

Also, although the above does not mention user selection (method in which M users (M<N) to be accommodated in a same frame are selected from N user candidates), it is possible to combine an arbitrary user selection method and the above-described scheduling method.

Also, although user separation in multiuser MIMO is implemented by, for example, precoding processing for interference cancellation such as a BD (block diagonalization) method, the present invention is not limited to this example.

Also, the high-speed communication terminals and the low-speed communication terminals may measure downlink communication qualities simultaneously, but if the measurement is performed using different reference signals, it is not necessary to take spatial multiplexing or excessive counts of layers into consideration in the low-speed communication terminals. Therefore, for the low-speed communication terminals, the need to perform frequency multiplexing of orthogonal pilots of the antennae is eliminated, and the reference signals can closely be arranged in the frequency direction accordingly. Consequently, accuracy of measurement of communication qualities (receiving power in the frequency domain) of the low-speed communication terminals is enhanced.

Also, a radio communication system to which the above-described scheduling method is applied is not limited to the example configuration of the radio communication system illustrated in FIG. 1.

Embodiment 2

In Embodiment 2, scheduler 11 assigns a plurality of radio resource blocks that are distant from each other in a frequency direction, to each of low-speed communication terminals.

Figure 7:
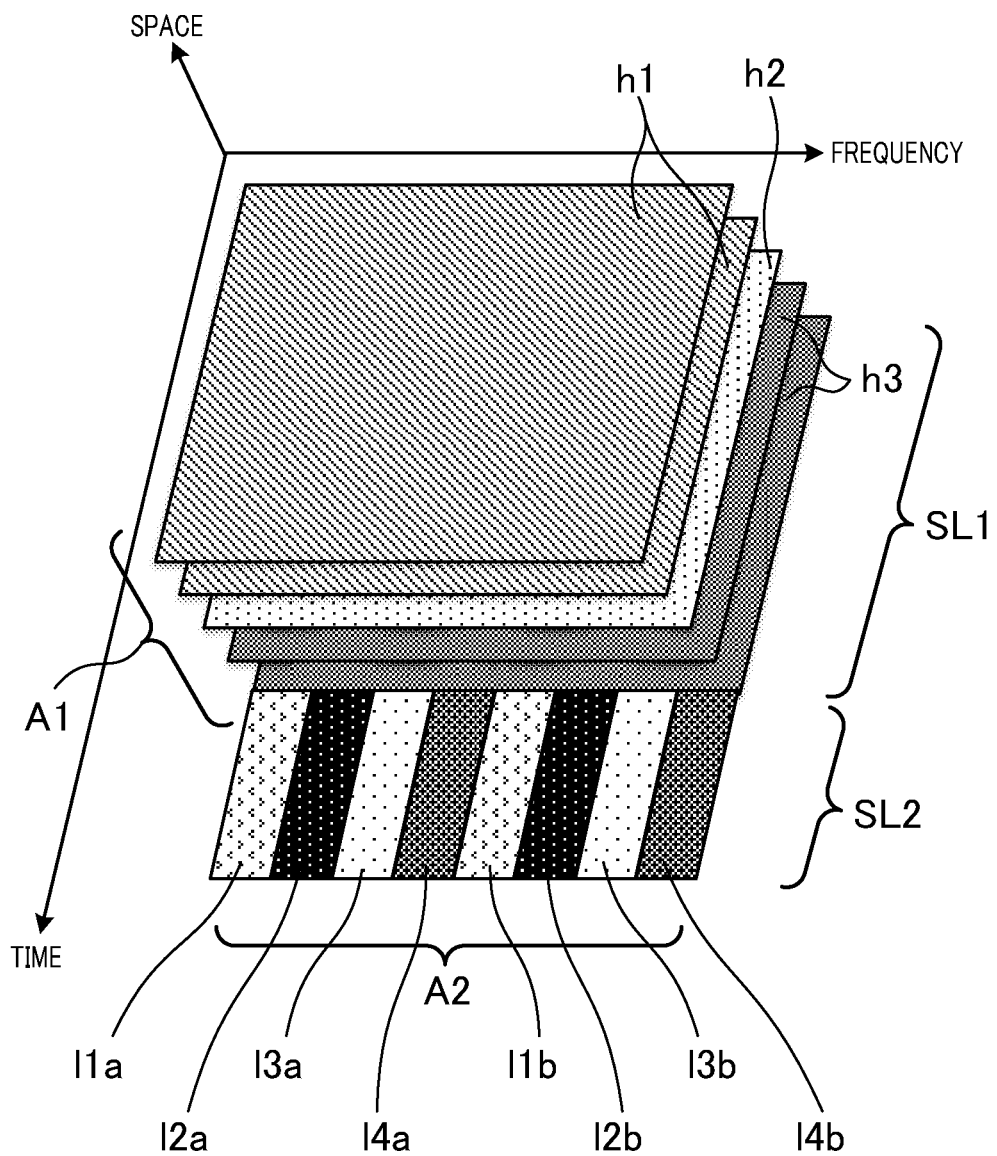
FIG. 7 is a diagram illustrating operation of a scheduler according to Embodiment 2.

FIG. 7 is a diagram illustrating operation of scheduler 11 according to Embodiment 2. In FIG. 7, example radio resources assigned to high-speed communication terminals H1 to H3 and low-speed communication terminals L1 to L4 are illustrated. In FIG. 7, components that are the same as those in FIG. 4 are provided with reference numerals that are the same as those in FIG. 4. In the below, parts that are different from those of FIG. 4 will be described.

Scheduler 11 assigns radio resource blocks that are distant from each other in the frequency direction to each of downlinks of low-speed communication terminals L1 to L4. For example, scheduler 11 assigns radio resource l1a and radio resource l1b that is distant from radio resource l1a in the frequency direction to low-speed communication terminal L1. Scheduler 11 assigns radio resource l2a and radio resource l2b that is distant from radio resource l2a in the frequency direction to low-speed communication terminal L2.

Scheduler 11 assigns radio resource l3a and radio resource l3b that is distant from radio resource l3a in the frequency direction to low-speed communication terminal L3. Scheduler 11 assigns radio resource l4a and radio resource l4b that is distant from radio resource l4a in the frequency direction to low-speed communication terminal L4.

As described above, scheduler 11 assigns a plurality of radio resource blocks that are distant from each other in the frequency direction to each of the downlinks of low-speed communication terminals L1 to L4. Consequently, MMeNB 3 can suppress an error in data transmitted to the communication terminals by means of a frequency diversity effect in which a narrow-band signal is dispersed to a broad band. For example, in 5G, frequency selective fading is alleviated, and thus, assignment of a plurality of radio resource blocks that are not continuous with each other in the frequency direction to a communication terminal enables suppression of an error in data transmitted to the communication terminal.

Also, MMeNB 3 can more effectively suppress an error in combination with error correction coding.

Also, a combination of the above-described assignment method and a method in which information on frequencies for which assignment of respective radio resource blocks in the frequency direction is prevented is transmitted to MMeNB 3 enables avoiding use of radio resource blocks of poor reception quality. Also, variations in reception quality of remaining radio resource blocks can be accommodated by the frequency diversity effect. Also, an amount of the information on frequencies for which assignment of respective radio resource blocks is prevented, which is transmitted to MMeNB 3, can be reduced.

Although the above description has been provided in terms of the downlinks, scheduler 11 can perform scheduling of uplinks in a manner that is similar to the above.

Embodiment 3

In Embodiment 3, scheduler 11 assigns high-speed communication terminals and low-speed communication terminals to a same time slot and subjects the high-speed communication terminals and the low-speed communication terminals to spatial multiplexing.

Figure 8:
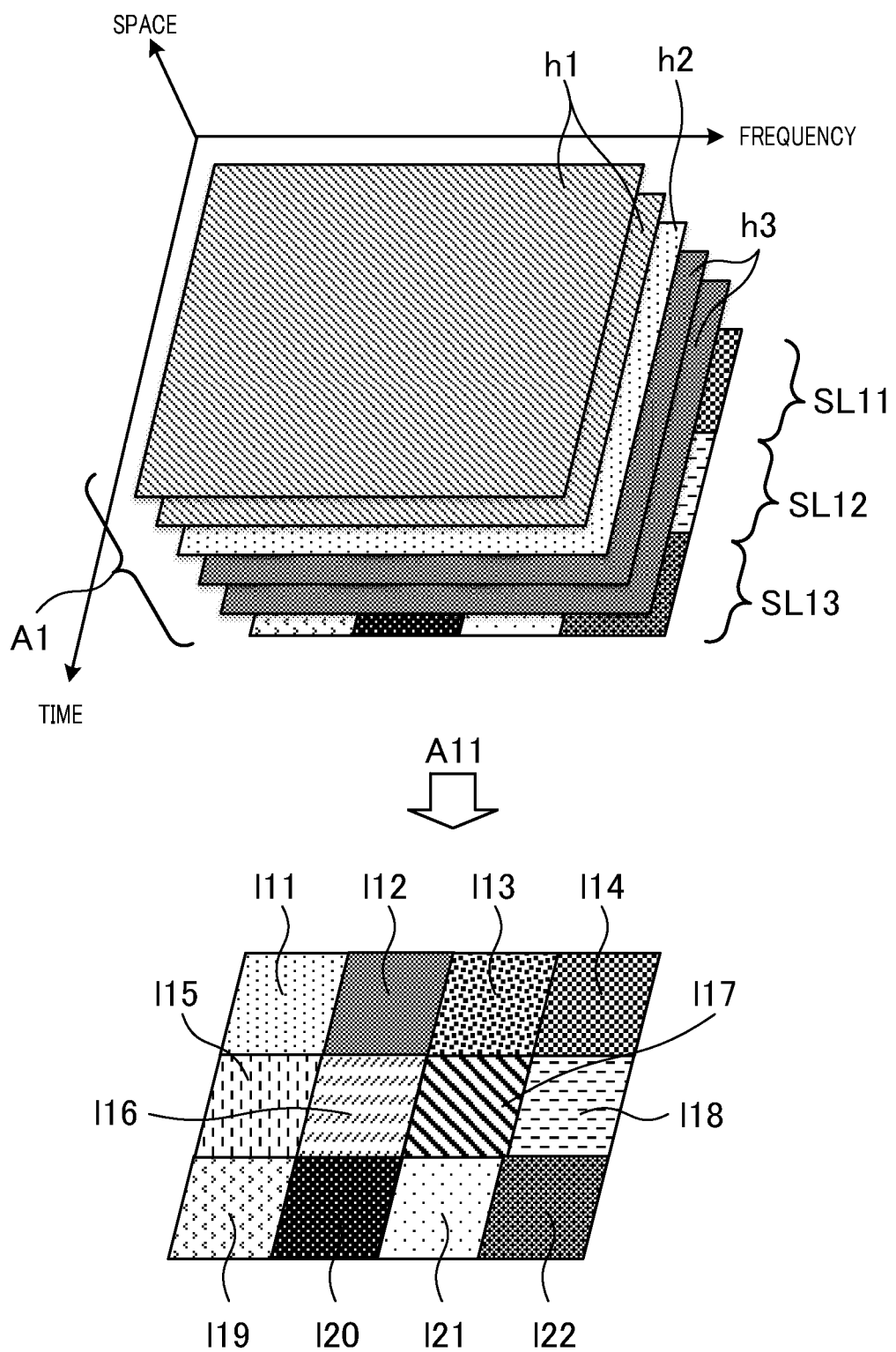
FIG. 8 is a diagram illustrating operation of a scheduler according to Embodiment 3.

FIG. 8 is a diagram illustrating operation of scheduler 11 according to Embodiment 3. In FIG. 8, example radio resources assigned to high-speed communication terminals H1 to H3 and low-speed communication terminals L1 to L12 are illustrated. Arrow A11 in FIG. 8 indicates a radio resource assigned to low-speed communication terminals L11 to L22. In FIG. 8, components that are the same as those in FIG. 4 are provided with reference numerals that are the same as those in FIG. 4. The below description will be provided in terms of parts that are different from those in FIG. 4.

Scheduler 11 assigns downlinks of high-speed communication terminals H1 to H3 and downlinks of low-speed communication terminals L11 to L22 to a same time slot. For example, scheduler 11 assigns the downlinks of high-speed communication terminals H1 to H3 to slots SL11 to SL13. Also, scheduler 11 assigns the downlinks of low-speed communication terminals L11 to L22 to slots SL11 to SL13. Here, radio resources l11 to l22, which are illustrated in FIG. 8, indicate radio resources assigned to low-speed communication terminals L11 to L22 and thus indicate that a plurality of low-speed communication terminals have been subjected to frequency-division multiplexing or time-division multiplexing. Although the above description has been provided in terms of the downlinks, scheduler 11 can perform scheduling of uplinks in a manner that is similar to the above.

As described above, while scheduler 11 performs user multiplexing for high-speed communication terminals H1 to H3 by means of space-division multiplexing, scheduler 11 performs user multiplexing for low-speed communication terminals L11 to L22 by means of frequency-division multiplexing or time-division multiplexing. Furthermore, the high-speed communication terminals and the low-speed communication terminals are subjected to spatial multiplexing relative to each other. Consequently, scheduler 11 can efficiently assign radio resources.

The respective embodiments have been described above.

(Hardware Configuration)

The block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 9:
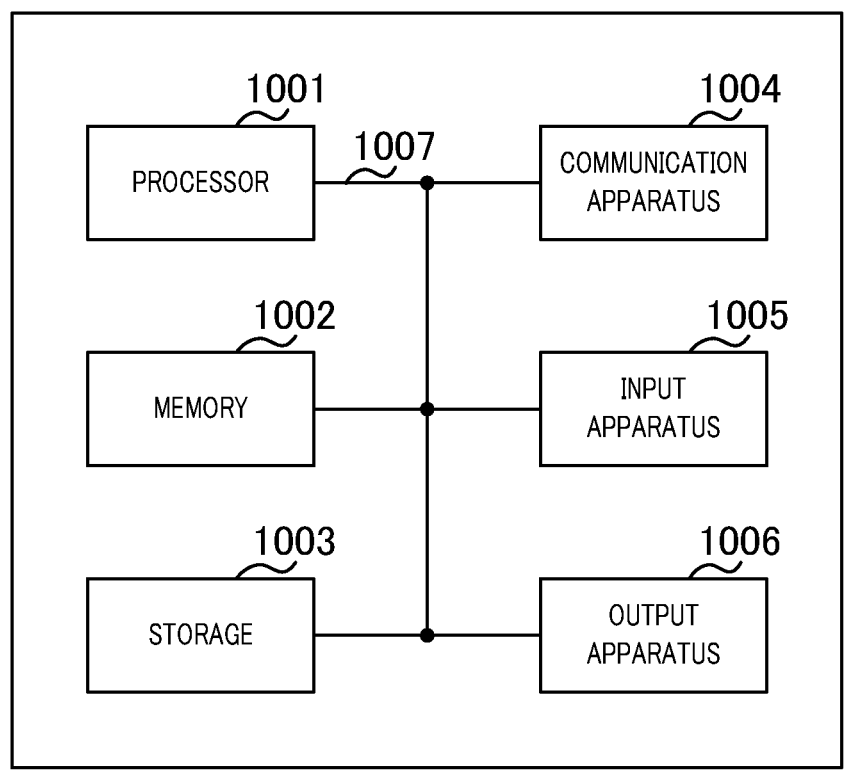
FIG. 9 is a diagram illustrating an example of a hardware configuration of a MMeNB and a communication terminal according to an embodiment of the present invention.

For example, MMeNB 3, a communication terminal, and the like according to an embodiment of the present invention may each function as a computer that performs processing a radio communication method according to the present invention. FIG. 9 illustrates an example of a hardware configuration of the MMeNB3 and the communication terminal according to an embodiment of the present invention. The MMeNB3 and communication terminal as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of the MMeNB and of the communication terminal may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

Each function of the MMeNB and the communication terminals is implemented by reading predetermined software (program) into hardware such as processor 1001, memory 1002, and the like and causing processor 1001 to perform arithmetic operation and control communication via communication apparatus 1004 or reading and/or writing of data to/from memory 1002 and storage 1003.

Processor 1001 operates an operating system to entirely control the computer, for example. Processor 1001 may be composed of a central processing unit (CPU) including an interface with peripheral apparatuses, a control apparatus, an arithmetic apparatus, a register, and the like. For example, scheduler 11, I/F section 12, transmission signal generating section 13, encoding/modulation section 14, mapping section 15, demapping section 18, channel estimation section 19, decoding/demodulation section 20 and communication quality obtaining section 21 may be implemented by processor 1001. Also, application section 31, transmission signal generating section 32, encoding/modulation section 33, mapping section 34, demapping section 37, channel estimation section 38, decoding/demodulation section 39 and communication quality measuring section 40 may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least a part of functional blocks included in the MMeNB and the communication terminal may be stored in memory 1002 and be implemented by a control program operating in processor 1001, and the other functional blocks may also be implemented in a manner that is similar to the above. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may also be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, the MMeNB and the communication terminal may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a radio communication system.

The present patent application claims the benefit of priority based on Japanese Patent Application No. 2017-040197 filed on Mar. 3, 2017, and the entire content of Japanese Patent Application No. 2017-040197 is herein incorporated by reference.

REFERENCE SIGNS LIST

1 CC
2 MeNB
3 MMeNB
4 high-speed communication terminal
5 low-speed communication terminal
11 scheduler
21 communication quality obtaining

The invention claimed is:
1. A radio base station comprising:
a processor coupled to a memory, configured to:
  obtain a first communication quality of each of first communication terminals and obtain a second communication quality of each of second communication terminals having a lower communication speed than the first communication terminals; and
  schedule the first communication terminals based on the first communication qualities and schedule the second communication terminals based on the second communication qualities,
wherein, when the processor schedules the first communication terminals and the second communication terminals, the processor subjects the first communication terminals to space-division multiplexing and subjects the second communication terminals to frequency-division multiplexing or time-division multiplexing, wherein the space-division multiplexing includes assigning counts of multiple-input and multiple-output (MIMO) layers to the first communication terminals based on signal-to-noise ratios (SNRs) associated with the first communication terminals, wherein a larger number of MIMO layers are assigned to first communication terminals that have a higher SNR, wherein the processor assigns the first communication terminals and the second communication terminals to different time slots, and wherein the processor determines the numbers of assigned time slots according to a ratio between a total required transmission speed of the first communication terminals and a total required transmission speed of the second communication terminals.

2. The radio base station according to claim 1, wherein:

the second communication qualities include frequency information for preventing assignment of a radio resource block in a frequency direction; and the processor selects a radio resource block from among radio resource blocks of frequencies for which assignment of a radio resource block is not prevented, and the processor assigns the radio resource block to the second communication terminals.

3. The radio base station according to claim 1, wherein the processor assigns radio resource blocks that are distant from each other in a frequency direction, to the second communication terminals.

4. A scheduling method for a radio base station, the method comprising:

obtaining a first communication quality of each of first communication terminals and obtaining a second communication quality of each of second communication terminals having a lower communication speed than the first communication terminals; and scheduling the first communication terminals based on the first communication qualities and scheduling the second communication terminals based on the second communication qualities, wherein, when the first communication terminals and the second communication terminals are scheduled, the first communication terminals are subjected to space-division multiplexing and the second communication terminals are subjected to frequency-division multiplexing or time-division multiplexing, wherein the space-division multiplexing includes assigning counts of multiple-input and multiple-output (MIMO) layers to the first communication terminals based on signal-to-noise ratios (SNRs) associated with the first communication terminals, wherein a larger number of MIMO layers are assigned to first communication terminals that have a higher SNR, wherein the first communication terminals and the second communication terminals are assigned to different time slots, and wherein the numbers of assigned time slots are determined according to a ratio between a total required transmission speed of the first communication terminals and a total required transmission speed of the second communication terminals.

* * * * *